United States Patent [19]
Giordano et al.

[11] Patent Number: 4,806,240
[45] Date of Patent: Feb. 21, 1989

[54] ADAPTER AND CARTRIDGE ASSEMBLY

[75] Inventors: Edward C. Giordano, Glastonbury; Raymond M. Petrucci, Middlebury, both of Conn.

[73] Assignee: Cuno, Incorporated, Meriden, Conn.

[21] Appl. No.: 62,299

[22] Filed: Jun. 12, 1987

[51] Int. Cl.⁴ .................. B01D 27/08; B01D 35/02
[52] U.S. Cl. ............................. 210/232; 210/437; 210/440; 210/444; 210/447; 55/502; 206/831; 220/319; 220/351; 220/378
[58] Field of Search ............. 210/232, 234, 235, 237, 210/435, 437, 440, 443, 444, 447, D17, 282, 287; 55/490, 529, 502; 206/831; 220/315, 319, 345, 351, 361, 378

[56] References Cited

U.S. PATENT DOCUMENTS

| 3,300,049 | 1/1967 | Hardcastle | 210/232 |
| 3,490,594 | 1/1970 | Hutchins, Jr. | 210/232 |
| 3,540,594 | 11/1970 | Sanderson | 210/232 |
| 3,743,096 | 7/1973 | Harvey, Jr. et al. | 210/232 |
| 4,052,307 | 10/1977 | Humbert, Jr. | 210/D17 |
| 4,371,439 | 2/1983 | Tharton | 210/232 |
| 4,452,695 | 6/1984 | Schmidt | 210/232 |
| 4,637,874 | 1/1987 | Ansteth | 210/232 |
| 4,654,142 | 3/1987 | Thomsen et al. | 210/232 |
| 4,719,012 | 1/1988 | Groezinger et al. | 210/232 |

FOREIGN PATENT DOCUMENTS 982548  2/1965  United Kingdom ............. 210/D17

Primary Examiner—Richard V. Fisher
Assistant Examiner—Wanda L. Millard
Attorney, Agent, or Firm—Weingram & Zall

[57] ABSTRACT

The present invention sets forth an adapter for filter cartridges and a mating cartridge which provides sealing means between the cartridge and the adapter and sealing means between the adapter and a filter head to which it is to be installed, and means for installing the adapter on a cartridge and for installing the adapter in the filter head with an aligning and locking means that ensures that all parts are appropriately positioned for proper function and at the same time will prevent physical disengagement and/or a break in the flow path from the cartridge to the filter head when the cartridge and adapter are properly installed in the filter head.

8 Claims, 7 Drawing Sheets

ADAPTER AND CARTRIDGE ASSEMBLY

BACKGROUND OF THE INVENTION

1. Field of the Invention

This invention relates to cartridge type filters and, more particularly, to an assembly of an adapter and a filter which can be used with a wide variety of filtering heads.

2. Description of the Prior Art

Cartridge type filters used for filtering of liquids are manufactured in many shapes and forms. They usually consist of a fixed head and then a removable cartridge which interacts with the head which is permanently or fixedly installed in the piping system in which the filter is installed.

The wide variety of filters that are now marketed and which have been marketed in the past often makes it difficult to obtain the appropriate cartridge that can fit into the head of the filter. Often, filter heads are made that require a specialized cartridge which cannot be easily obtained. An example of such a filter system is shown in U.S. Pat. No. 3,746,171, issued July 17, 1973, to Thomsen. This filter assembly has an unusually shaped filter head that requires a fairly complex and uniquely designed cartridge to mate with the head.

Since it is desirable to be able to use cartridges supplied from a wide variety of sources, both in this system and the other filtering systems presently in use, an adapter is desired that would enable the use of a standard cartridge or a relatively standard cartridge, which adapter could be easily installed on the cartridge and which could then form an assembly that, in turn, could be easily installed in the filter head. It is important that the adapter securely fasten to the cartridge and, in turn, that the adapter can be securely fastened within the filter head to ensure that there will be no failure of the system once the cartridge and adapter are installed. Additionally, it is important that effective sealing be obtained between the cartridge and the adapter and between the adapter and the filter head to prevent any leakage when the system is installed. Also, it is important that installation of the adapter to the cartridge and the adapter to the housing be relatively swift and easy. Further, it is desirable that the adapter be capable of using widely available cartridge type filters such as those similar to the type shown in U.S. Pat. No. 3,954,624, issued May 4, 1976, to Petrucci, and those sold by CUNO Incorporated such as AQUA-PURE 517 (AP517).

Attempts have been made in the past to provide adapters, but they have been less than successful. For example, the patent to Offer, U.S. Pat. No. 3,395,808, shows a relatively simple device but reguires an entire external housing to hold the replacement filter. The patents to Harvey, U.S. Pat. No. 3,743,096, issued July 3, 1973, and to Sanderson, U.S. Pat. No. 3,540,594, show adapters which are not suitable for mounting of cartridge type filters having narrow necks in wide mouthed filter heads.

The Sanderson U.S. Pat. No. 3,540,594, is suitable only for use with a filter head that accepts a very wide type filter cartridge and could not house a narrow filter cartridge. Similarly, Harvey, U.S. Pat. No. 3,743,096, which provides for a flow reversal from inlet to outlet requires an inordinately large amount of room and which could not be used with existing filter heads.

SUMMARY AND OBJECTS OF THE INVENTION

Accordingly, to overcome the problems discussed above, the present invention sets forth an adapter for filter cartridges and a mating cartridge which provides sealing means between the cartridge and the adapter and sealing means between the adapter and a filter head to which it is to be installed, and means for installing the adapter on a cartridge and for installing the adapter in the filter head with an aligning and locking means that ensures that all parts are appropriately positioned for proper function and at the same time will prevent physical disengagement and/or a break in the flow path from the cartridge to the filter head when the cartridge and adapter are properly installed in the filter head.

Accordingly, it is an object of the present invention to provide an adapter for connecting a filter cartridge to a filter head which can be easily and quickly installed on the filter cartridges.

Another object of the invention is to provide an adapter for connecting a filter cartridge to a filter head which can be installed with a minimum of difficulty.

A further object of the invention is to provide an adapter for connecting a filter cartridge to a filter head which, once installed, cannot be accidentally removed.

Yet another object of the invention is to provide an adapter for connecting a filter cartridge to a filter head which can be made in a wide variety of manners to fit a variety of filter cartridges.

It is another object of the invention to provide an adapter for connecting a filter cartridge to a filter head which has sealing means between the cartridge and the adapter that are provided totally by o-rings and do not require precision machining of surfaces.

A further object of the invention is to provide an adapter for connecting a filter cartridge to a filter head which can provide for reversal of inlet and outlet flow paths without undue complexity and with high reliability as to leaks or disruptions in flow.

Another object of the invention is to provide an adapter for connecting a filter cartridge to a filter head which can be easily removed from a cartridge.

A further object of the invention is to provide an adapter for connecting a filter cartridge to a filter head which will easily engage with a filter head.

Yet another object of the invention is to provide an adapter for connecting a filter cartridge to a filter head which will be held securely within the filter head once engaged.

A still further object of the invention is to provide an adapter for connecting a filter cartridge to a filter head which does not require special seating surfaces to seat in a filter head.

Another object of the invention is to provide an adapter for connecting a filter cartridge to a filter head which includes a locking mechanism so that once properly seated in the filter head a cartridge installed in the adapter cannot be removed and will maintain appropriate flow channels from the cartridge to the filter head.

A further object of the invention is to provide an adapter for connecting a filter cartridge to a filter head which contains locking means to properly align the various elements of the adapter.

Yet another object of the invention is to provide an adapter for connecting a filter cartridge to a filter head which locking means coact with the installation of the adapter into the filter head.

A further object of the invention is to provide an adapter for connecting a filter cartridge to a filter head in which a cartridge can be quickly and positively installed.

Another object of the invention is to provide an adapter for connecting a filter cartridge to a filter head where the adapter can be installed on the cartridge at a location conveniently removed from the filter head.

An object of the invention is to provide a filter cartridge having sealing means that are relatively inexpensive and durable.

Another object of the invention is to provide a filter cartridge which is easy to replace if damaged.

A further object of the invention is to provide a filter cartridge which has engaging means that are relatively simple.

Yet another object of the invention is to provide a filter cartridge which has engaging means which allow for easy insertion of an adapter to the cartridge.

Still another object of the invention is to provide an adapter and filter cartridge assembly which is durable.

Another object of the invention is to provide an adapter and filter cartridge assembly which is reliable.

It is a further object of the invention to provide an adapter and filter cartridge assembly which is relatively inexpensive to manufacture.

Yet another object of the invention is to provide an adapter and filter cartridge assembly which gives a positive indication of whether or not the parts are properly aligned prior to insertion of the adapter and cartridge into the filter head.

Other objects and advantages will be apparent from the following detailed description of the invention.

DETAILED DESCRIPTION OF THE INVENTION

Figure 1:
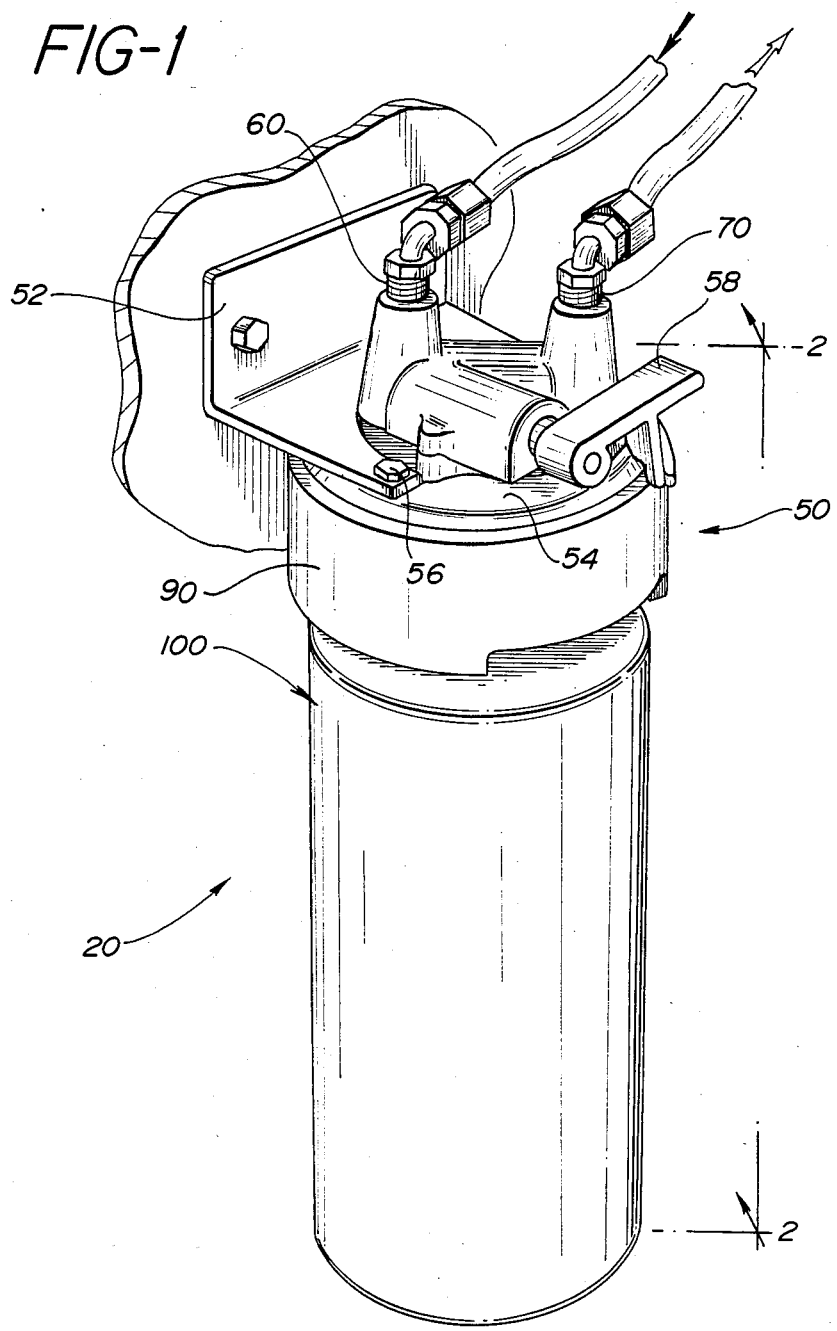
FIG. 1 is a perspective view showing a filter assembly mounted to a stationary object with the flow fittings attached.
Figure 2:
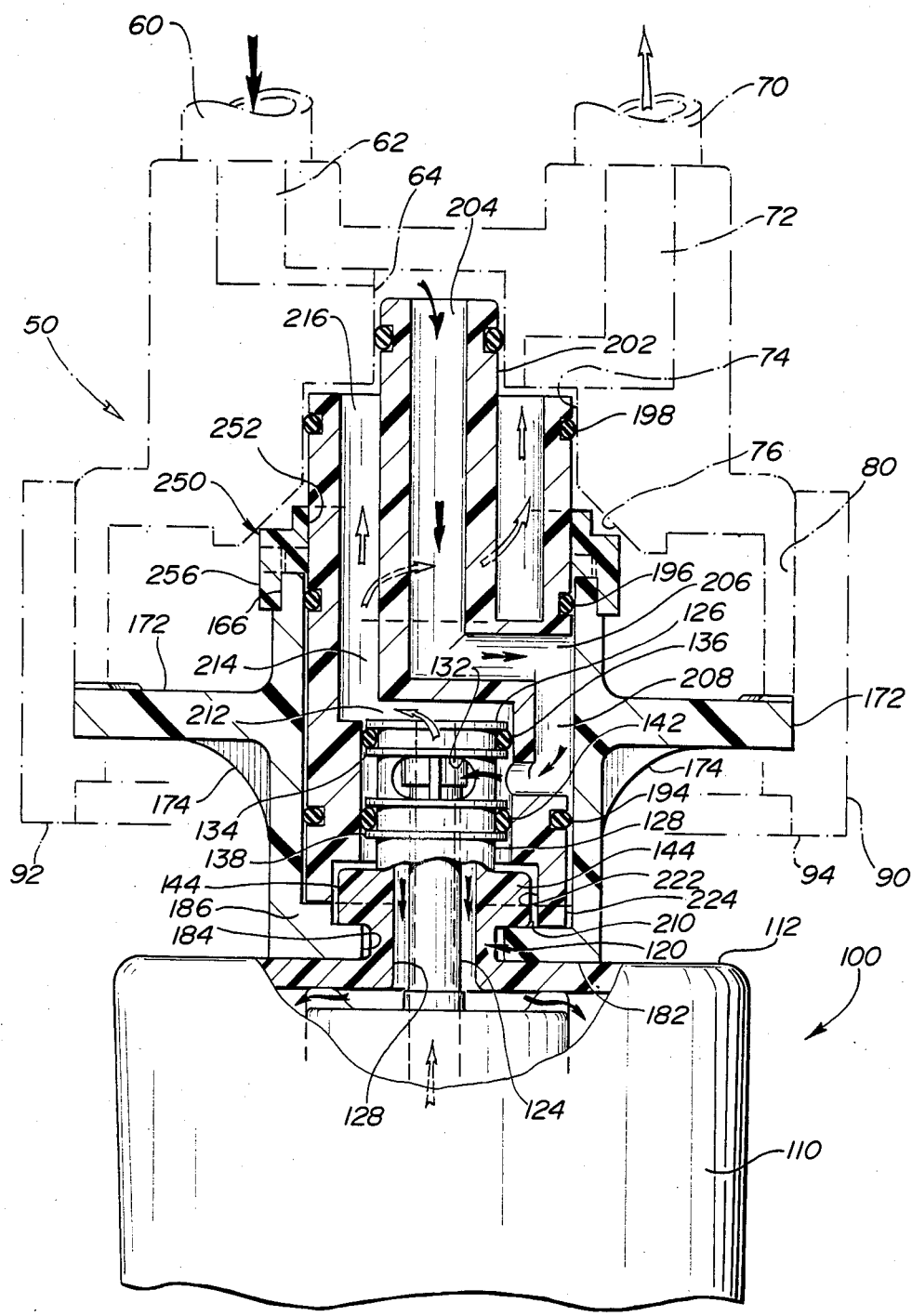
FIG. 2 is an elevation, partially in section, of the filter cartridge and adapter, with the filter head shown in phantom.
Figure 3:
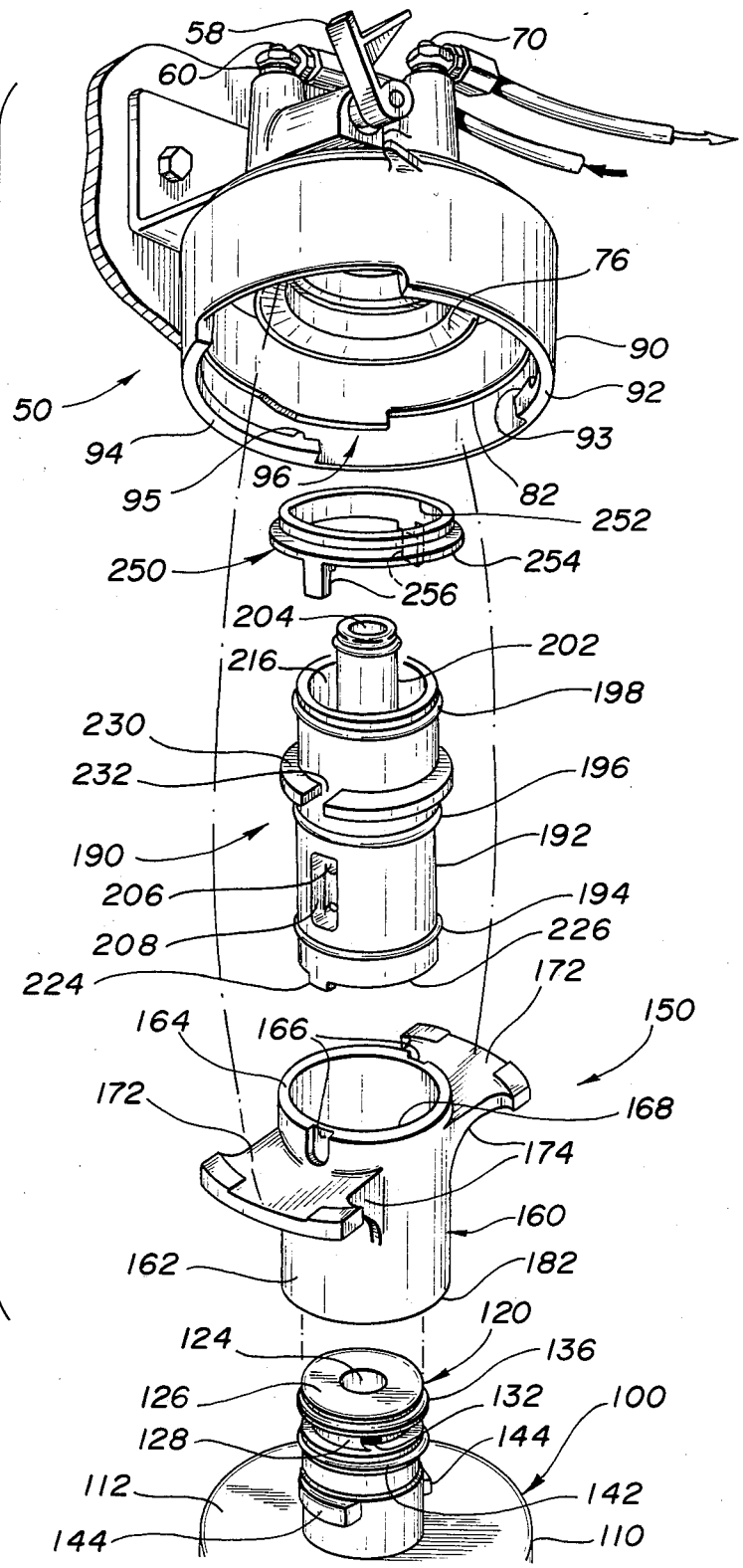
FIG. 3 is an exploded view of the material shown in FIGS. 1 and 2.
Figure 4:
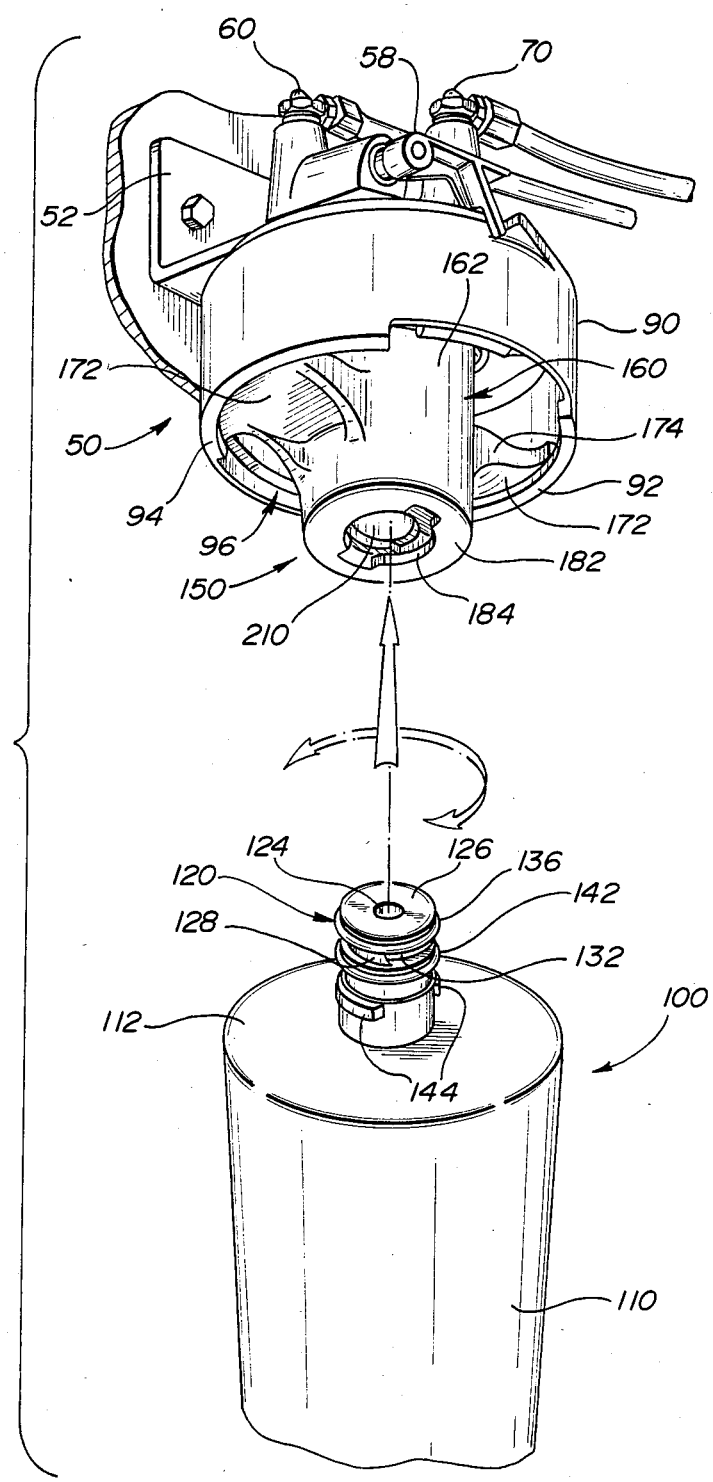
FIG. 4 is an exploded persepective showing the adapter installed in the filter head, and the cartridge separate and spaced from the adapter.

Referring to the figures, FIGS. 1, 2 and 3 show a filter assembly generally indicated at 20 having a stationary head 50 to which a cartridge 100 is mounted by means of an adapter 150. The filter head 50 is mounted to a stationary object by means of a mounting bracket 52 connected to the top surface of the head 54 and to the stationary wall by means of bolts 56 or any other convenient fastening means. The filtering head is clearly shown and described in U.S. Pat. No. 3,746,171, issued July 17, 1973, to Thomsen, the specification of which is incorporated herein by reference.

Referring to FIG. 1, the head 50 has an inlet means 60 and an outlet means 70 having flow passages within the head 62 and 72, respectively for the inlet and outlet. The inlet flow passage 62 communicates with an inlet bore 64 whereas the outlet passage communicates with a wider outlet bore 74. The outlet bore 74 ends in a conically tapered surface 76. The filter head has a head skirt 80, the bottom surface of which 82 is an irregular camming surface. A rotary collar 90 having arcuate sections 92,94 forms an eccentric opening or a keyed opening generally indicated at 96 to receive an eccentrically shaped r matchingly keyed member which will be fastened to the head by coaction of the rotatable collar 90 with the head skirt. The rotating collar 90 itself will be positioned by means of camming surfaces on the external side of the head skirt 80 so that as the collar rotates it will be raised or lowered with relation to the fixed portion of the head. As can be seen in FIG. 3, the arcuate segments 92 and 94 also have camming surfaces generally indicated at 93 and 95 on the upper portions thereof. A shutoff valve assembly 58 is shown at the top of the filtering head.

As seen in FIGS. 2 and 3, the cartridge generally indicated at 100 has a body generally indicated at 110 and a flow probe generally indicated at 120 having inlet and outlet flow passages. A filter having a similar type of inlet and outlet flow passage arrangement is shown in U.S. Pat. No. 3,954,624, issued May 4, 1976, to Petrucci, the entire specification of which is incorporated herein by reference.

As seen in FIGS. 2 and 3, the inlet flow passage is formed by a larger outer tube 128 which forms the outer wall of the flow probe which is axially and circumferentially disposed about the outlet tube 124. The entrance to the inlet tube is in an opening 132 in the side of the inlet tube. A plurality of circumferential ribs 134 hold an upper o-ring 136 and a plurality of lower circumferential ribs 138 hold a lower o-ring 142 in the position about the flow probe to coact with the receptacle for the cartridge and seal and isolate the flow to the inlet from the flow from the outlet of the cartridge.

Extending from the lower portion of the flow probe or neck 120 are a pair of mounting toes 144 which extend radially outward to coact with securing means in the adapter and which normally be used to mount the cartridge in a suitable filter head. The mounting toes are disposed in space relation to the top surface 112 of the cartridge body.

The adapter, generally indicated at 150, is adapted to fit on the cartridge, generally indicated at 100, and the adapter is also intended to fit into the head 50 of the filter assembly. The adapter 150 consists of an outer shell, generally indicated at 160, an aligning and locking ring, generally indicated at 250, and a core section, generally indicated at 190.

Figure 5:
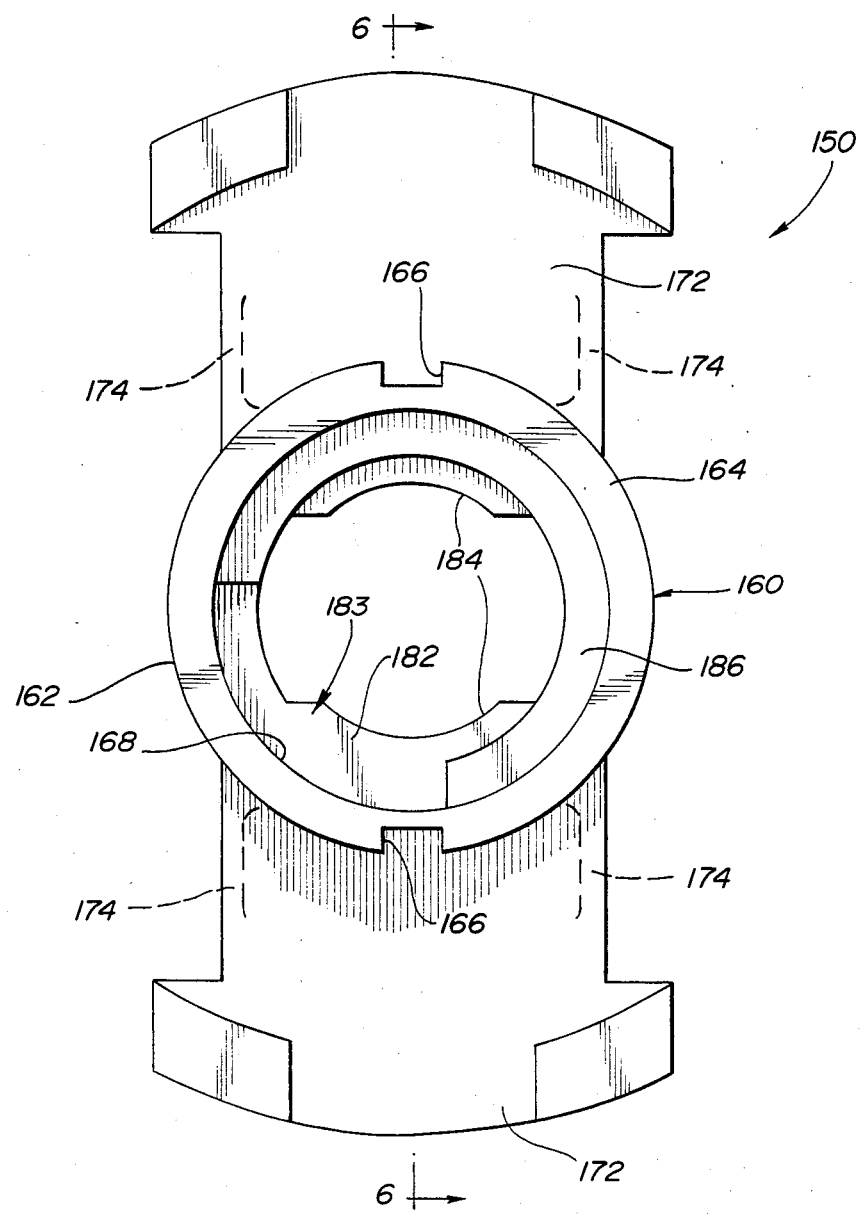
FIG. 5 is a top view of the housing for the adapter.
Figure 6:
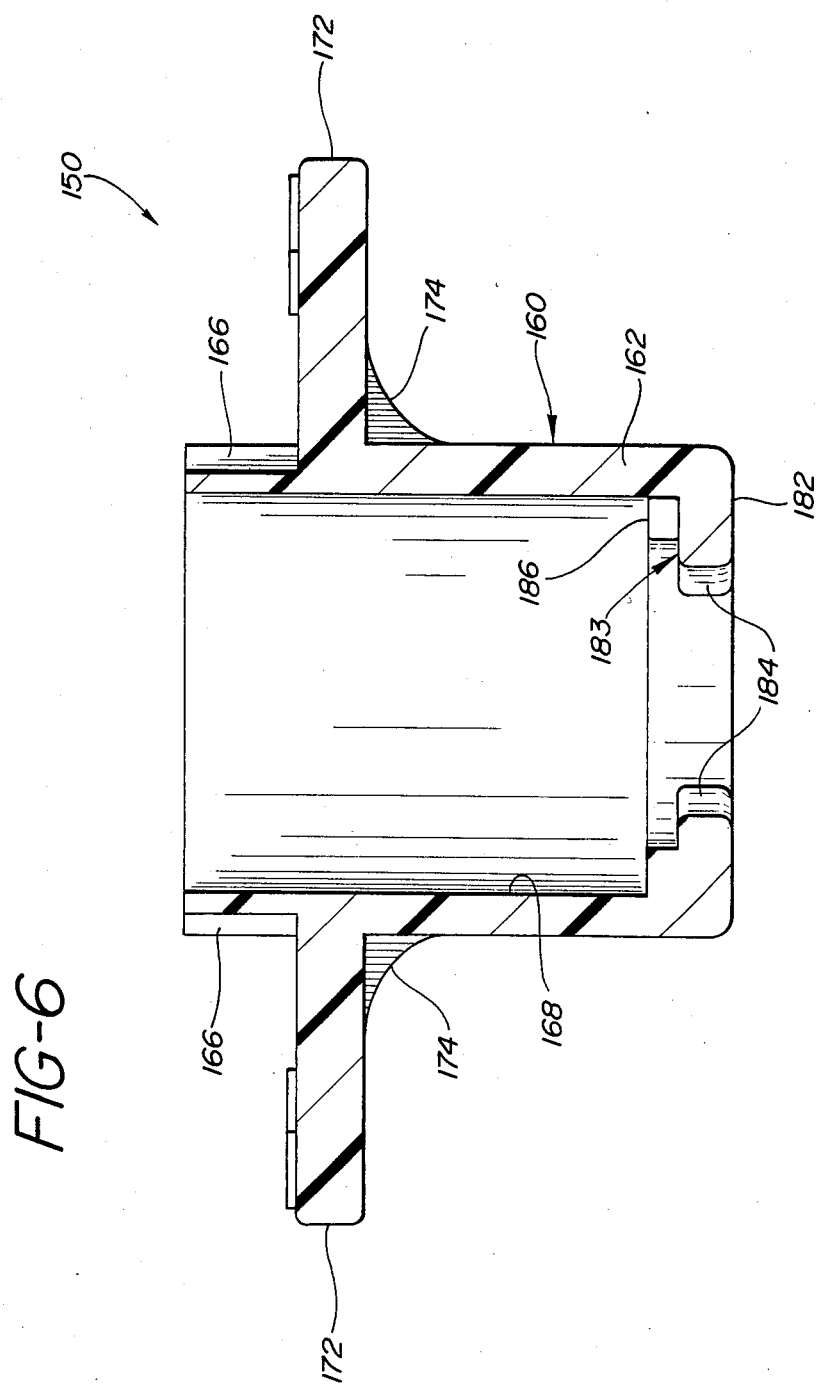
FIG. 6 is a cross-sectional view of an elevation of the housing for the adapter.

The outer shell consists of a tubular wall, generally indicated at 162, having a flat upper surface 164 with two diametrically opposed axially extending slots 166 extending in the outer wall downward from the top. A pair of wings 172 are diametrically opposed and are strengthened by means of buttresses 174 which connect the wings to the outer wall 162. As seen in FIGS. 5 and 6, the outer shell 160 has a bottom surface 182 in which a key shaped passage 184 is formed. An arcuate support rib 186, circular in shape and extending partially around the bottom of the outer shell is provided. Accordingly, there will be a portion at the bottom in which the support rib 186 is present and a portion in which there will be no supporting rib so that the inner surface of the bottom of the outer shell is exposed. In effect, the area where support rib 186 is not present forms a pocket 183.

The shell 160 has a cylindrical inner surface 168 which is adapted to coact with portions of the core 190 as will be now described.

Seated within the outer shell 160 of adapter 150 is the core portion 190 which acts to connect the flow passages from the filter head to that of the cartridge. The core portion, generally indicated at 190, consists of a solid body having a generally cylindrical outer wall 192 with three o-rings, a lower, middle and upper o-ring, 194, 196 and 198 respectively, mounted in appropriate grooves in the outer wall 192. The outer wall 192 of core portion 190 fits within the inner surface 168 of the outer shell 160 and the lower and middle o-rings 194 and 196 coact to seal the outer wall of the core portion with respect to the inner wall of the outer shell. The upper o-ring 198 coacts with the outlet bore 74 of the filter head to seal the upper end of core portion 190 with the head 50 of the filter.

The core section has an inlet and outlet flow path that connects between the inlet passage 62 of th filter head and the inlet passage 132 in the flow probe 120 of the filter cartridge. The inlet flow passage is formed by an inlet tube, generally indicated at 202, having a vertical bore 204 which communicates with a horizontal bore 206 that, in turn, connects to an external groove 208 axially disposed in the wall of the core portion. A lower horizontal bore 212 communicates the flow to the lower cavity or flow probe receptacle 210 of the core section 190 which receives the flow probe 120 of the cartridge 100.

The core also contains an outlet flow passage to communicate the liquid from the outlet of the cartridge to the outlet of the filter head. The end of the bore 212 forming cavity 210 is spaced from the end of the outlet tube 126 of the flow probe 120 of the cartridge and forms a portion of the outlet flow passage from the core section 190 of the adapter. The end 212 of the lower cavity communicates with a vertical bore 214 which then communicates with an annular passage 216 which annular vertical passage is circumferentially disposed about the inlet tube 202. Vertical annular passage 216 communicates with the outlet passage 72 in the head 50 to provide the communication for the outlet of the liquid from the cartridge via the adapter to the head of the filter.

Figure 7:
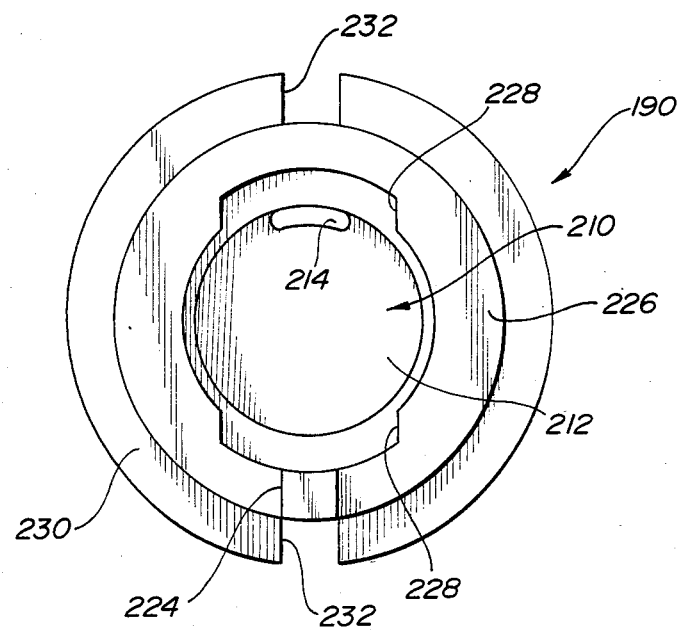
FIG. 7 is a bottom view of the housing for the adapter.

The lower cavity has a shoulder 222 to provide a wider bore which accommodates the mounting toes extending from the flow probe of the filter cartridge. The bottom of the core body 192 has a positioning finger 224 which is intended to coact with the bottom surface of the outer shell 182 and the support rib 186 so that the core section 190 will be in the lowest most position when the positioning finger 224 is properly positioned with relation to the outer shell. Additionally, as best seen in FIG. 7, the bottom surface 226 of core 190 has slots 228 intended to accommodate the mounting toes extending from the flow probe of the filter cartridge.

An alignment ring, generally indicated at 230, extends outwardly from the outer wall 192 of the core portion between the middle and upper external o-rings 196 and 198. The alignment ring has two grooves or slots 232.

A positioning collar, generally indicated at 250, is mounted about the outer wall of core 190 between the middle and upper o-rings 196 and 198, respectively. The collar has an axial bore 252 which allows it to have an easy slide fit with respect to the diameter of the outer wall 192 but which is small enough to capture the collar by the upper o-ring 198. A flange 254 extending from the collar has two arms 256 which coact with the slots 232 in alignment ring 230 and the slots 166 in the outer wall 162 of the outer shell 160. Accordingly, when the inner core is placed in the outer shell, the positioning collar falls to the lower position to contact the alignment ring 230. The arms 256 of the positioning collar will extend through the slots 232 of the alignment ring 230 to contact the slots 166 in the outer shell 160 of the adapter. The arms, therefore, will align the core member with the outer shell so that the adapter will turn as a single unit when the collar is in its lower or locking position.

The installation of the adapter on the cartridge is made relatively simple by means of the positioning collar. The flow probe or neck of the cartridge is placed into the slotted opening 184 in the bottom of the outer shell and engages the slots 228 in the bottom of the core so that the core will rotate with the cartridge. The cartridge is rotated to the right so that the mounting toes 144 of the cartridge will be out of registration with the slot 184 of the outer housing. The wings 172 of the outer housing 160 are held in place and the cartridge is rotated to the right which will bring the positioning finger up against the end of support rib 186 and stop rotation and leave the space 183 open for the positioning finger 224 of the inner core. The positioning arm 256 will then be in registration with slots 166 of the outer shell. The positioning collar 250 can then be brought down sufficiently to engage the arms 256 with the outer shell and thereby lock the cartridge within the adapter.

If the mounting toes 144 on the neck or flow probe 120 of the cartridge are not properly positioned with respect to the outer housing and the inner housing, then the inner core positioning finger 224 will not be in the proper location to align the positioning arms 256 with the outer shell and the positioning collar 250 cannot move down to its locked position.

The engagement of the positioning collar 250 with the outer shell 160 of the collar is a means of preventing movement of the cartridge when installed. Since the cartridge is secured with respect to the inner core 190 by means of the slots 228 in the bottom of the inner core, the cartridge cannot be rotated once the arms 256 of the positioning collar 250 engage the slots 166 on the outer shell, they will hold the inner core 190 fixed because the positioning arms extend through the slots 232 in the alignment ring 230 extending from the inner core.

Once the cartridge is assembled with the adapter, the adapter can be easily installed into the stationary filter head. The adapter with the cartridge attached is inserted into the filter head by placing the wings 172 of the adapter in the groove between the rotatable collar 90 and the camming surface 82 of the head skirt 80. The wings are then rotated to properly position them with respect to the camming surface of the skirt. The rotatable collar 90 is then rotated so that its camming action will raise the collar and carry the adapter via its wings upward to securely hold the adapter in place. Sealing is effected by the o-ring 198 on the inlet tube 202 and the o-ring 196 on the upper end of the core portion outer wall 192. As mentioned previously, the inlet tube o-ring 198 will coact with the wall of the inlet bore 64 on the filter head 50 while the o-ring 196 on the wall of the adapter will coact with the outlet bore 74 in the filter head. Once the rotatable collar of the filter head has been secured and the locking arm 58 placed in position to prevent the head from rotating, there is no longer any space for the positioning collar 250 of the adapter to move up out of engagement with the slots 166 in the outer wall of the adapter. Therefore, the core member 190 will be held in position and the core in turn will hold the mounting toes on the neck or flow probe of the cartridge in a stationary position.

To remove the adapter and cartridge assembly from the filter head, all that is necessary is to open up the valve handle 58, rotate the rotatable collar and then rotate the wings of the adapter to allow removal of the wings through the keyed opening 96 in the bottom of the rotatable collar. The adapter and cartridge assembly can then be separated by raising the positioning collar 250 and then rotating the cartridge until the mounting toes are aligned with the eccentric opening 184 or key shaped passage in the bottom of the outer shell 160 of the adapter to allow the cartridge to be withdrawn.

It will be understood that the various changes in details, materials, arrangements of parts and operating conditions which have been herein described and illustrated in order to explain the nature of the invention may be made by those skilled in the art within the principles and scope of the invention.

What is claimed is:

1. An adapter for connecting a filter cartridge to a filter head comprising:
   an outer shell;
   an inner core having a cylindrical section thereon;
   receptacle means in said adapter to receive said filter cartridge;
   lug means on said adapter to attach said adapter to a filter head;
   aligning means disposed on said cylindrical section of said inner core axially movable on said cylindrical section, said aligning means coacting with said outer shell to radially align said inner core with respect to said outer shell to maintain said filter cartridge in the receptacle means; and
   axially slidable means to lock the cartridge in the adapter, said locking means constructed and arranged to coact with the filter head to maintain the cartridge in the adapter.

2. The adapter of claim 1, further comprising flow path means in said adapter defined by coaction of said inner core with said outer shell.

3. The adapter of claim 1, wherein said inner core includes receptacle means which coact with receptacle means in said outer shell to receive and secure said filter cartridge.

4. The adapter of claim 3, further comprising sealing means between said inner core and said outer shell to seal said flow path means defined by coaction between said inner core and said outer shell.

5. The adapter of claim 1, wherein said aligning means further comprise means to lock the position of said inner core with respect to said outer shell.

6. The adapter of claim 5, wherein said receptacle means include receptacle means on said inner core adapted to coact with said receptacle means in said outer shell when said inner core is operatively positioned with respect to said outer shell.

7. The adapter of claim 6, wherein said receptacle means are constructed and arranged to receive a relatively narrow necked filter cartridge having eccentrically disposed mounting toes adapted to coact with the receptacle means of said adapter.

8. The adapter of claim 5, wherein said means to lock is a free floating means.

* * * * *